(12) United States Patent
Philpott et al.

(10) Patent No.: US 11,802,598 B2
(45) Date of Patent: Oct. 31, 2023

(54) WHEEL END SUPPORT ASSEMBLY AND METHOD OF ASSEMBLY

(71) Applicant: ArvinMeritor Technology, LLC, Troy, MI (US)

(72) Inventors: Daniel Philpott, Goodrich, MI (US); Soumar Jabbour, Sterling Heights, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 777 days.

(21) Appl. No.: 16/929,728

(22) Filed: Jul. 15, 2020

(65) Prior Publication Data
US 2022/0018404 A1    Jan. 20, 2022

(51) Int. Cl.
*F16D 51/00* (2006.01)
*B60B 35/04* (2006.01)
*F16D 66/00* (2006.01)

(52) U.S. Cl.
CPC .............. *F16D 51/00* (2013.01); *B60B 35/04* (2013.01); *F16D 66/00* (2013.01); *B60B 2320/10* (2013.01); *F16D 2051/003* (2013.01)

(58) Field of Classification Search
CPC ..... B60B 35/04; B60B 2320/10; F16D 51/00; F16D 2051/003; F16D 66/00
See application file for complete search history.

(56) References Cited

U.S. PATENT DOCUMENTS

| | | | |
|---|---|---|---|
| 6,216,832 B1 * | 4/2001 | Doell | F16D 51/00 188/341 |
| 8,827,054 B2 | 9/2014 | Chung et al. | |
| 9,096,259 B2 | 8/2015 | Varela et al. | |
| 9,291,223 B2 | 3/2016 | Varela et al. | |
| 9,598,104 B1 | 3/2017 | Lam et al. | |
| 2005/0206148 A1 * | 9/2005 | Nechvatal | B60T 8/329 280/752 |
| 2011/0089660 A1 * | 4/2011 | Dodd | B60G 7/001 280/124.128 |
| 2012/0247885 A1 * | 10/2012 | Lantz | F16D 65/00 83/13 |
| 2013/0098697 A1 * | 4/2013 | Power | B60B 35/04 301/132 |
| 2014/0042722 A1 | 2/2014 | Lam | |
| 2017/0241493 A1 * | 8/2017 | Hock | F16D 66/00 |

* cited by examiner

*Primary Examiner* — S. Joseph Morano
*Assistant Examiner* — Emily G. Castonguay
(74) *Attorney, Agent, or Firm* — Brooks Kushman PC

(57) ABSTRACT

A wheel end support assembly and method of assembly. The assembly may include a spindle, a brake torque plate, and a locator bushing. The locator bushing is received in a first locator hole of the spindle and a second locator hole of the brake torque plate and aligns the brake torque plate to the spindle.

20 Claims, 6 Drawing Sheets

WHEEL END SUPPORT ASSEMBLY AND METHOD OF ASSEMBLY

TECHNICAL FIELD

This document relates to a wheel end support assembly having a locator bushing and a method of assembly.

BACKGROUND

An axle assembly having a drum brake assembly is disclosed in U.S. Pat. No. 9,291,223.

SUMMARY

In at least one embodiment, a wheel end support assembly is provided. The wheel end support assembly may include a spindle, a brake torque plate, a locator bushing, and a sensor. The spindle may be adapted to support a wheel and may have a flange that defines a first locator hole. The brake torque plate may be adapted to support a brake assembly, may be disposed on the flange, and may define a second locator hole. The locator bushing may be received in the first and second locator holes and may align the brake torque plate to the spindle. The sensor may be received in the locator bushing.

In at least one embodiment, a wheel end support assembly is provided. The wheel end support assembly may include a spindle, a brake torque plate, a locator bushing, and a sensor. The spindle may be adapted to support a wheel and may have a flange that defines a first locator hole. The brake torque plate may be adapted to support a brake assembly, may be fastened to the flange, and may define a second locator hole. The locator bushing may extend around an axis and may rotationally align the brake torque plate to the spindle. The locating bushing may include a first portion and a second portion. The first portion may be disposed at a first end of the locator bushing and may be received in the first locator hole. The first portion may have a first outer surface that may face away from the axis and may engage the flange. The second portion may be disposed at a second end of the locator bushing and may be received in the second locator hole. The second portion may have a second outer surface that may face away from the axis and may engage the brake torque plate. The first and second outer surfaces may have different diameters. The sensor may be received in the locator bushing and may extend through the first and second locator holes.

In at least one embodiment, a method of assembling a wheel end support assembly is provided. The method may include positioning a brake torque plate adjacent to a flange of a spindle. The flange may define a first locator hole and a first fastener hole. The brake torque plate may define a second locator hole and a second fastener hole. A locator bushing may be inserted into the first and second locator holes to align the brake torque plate and the spindle. The brake torque plate may be coupled to the flange with a fastener that is inserted into the first and second fastener holes.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
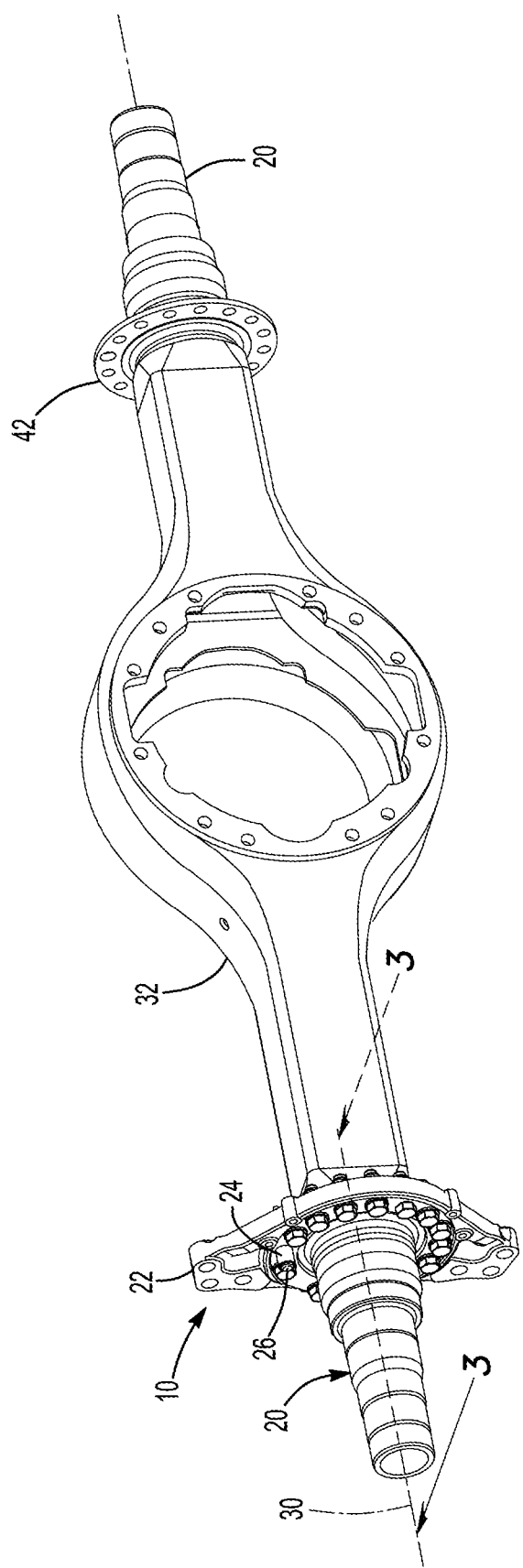
FIG. 1 is a perspective view showing a wheel end support assembly.

Referring to FIG. 1, an example of a wheel end support assembly 10 is shown. The wheel end support assembly 10 may be provided with a motor vehicle, such as a truck, bus, farm equipment, military transport or weaponry vehicle, or cargo loading equipment for land, air, or marine vessels. The wheel end support assembly 10 is configured to support a vehicle wheel 12 and facilitate mounting of a brake assembly 14, both of which are represented schematically in FIG. 3. In at least one configuration, the wheel end support assembly 10 may include a spindle 20, a brake torque plate 22, a locator bushing 24, and a sensor 26.

Figure 2:
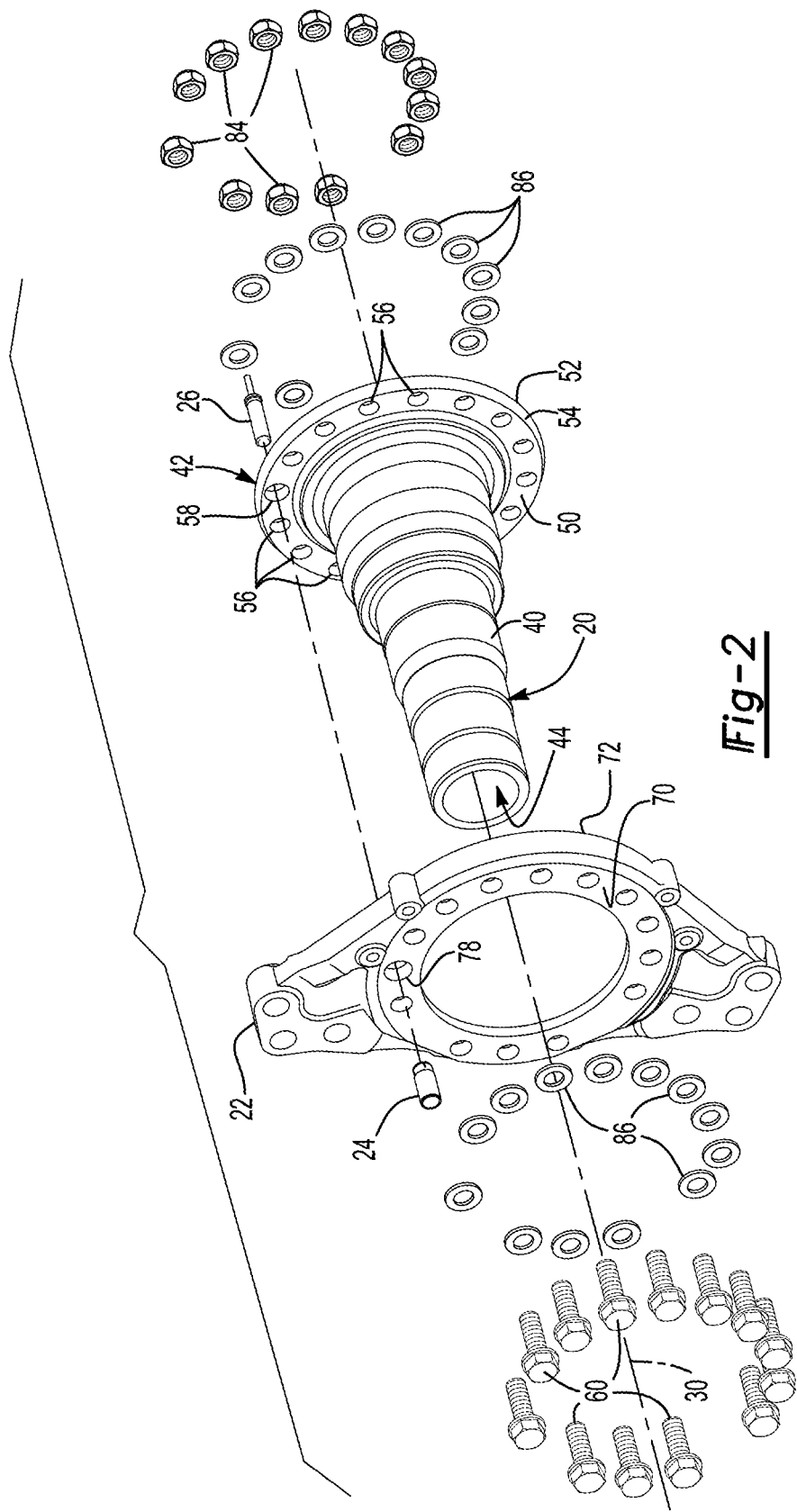
FIG. 2 is an exploded view of a portion of FIG. 1.

Referring to FIGS. 1 and 2, the spindle 20 may be adapted to support a vehicle wheel. For example, the spindle 20 may support a wheel hub to which a wheel may be mounted. In at least one configuration, the spindle 20 may be received in and may support one or more wheel bearings, which in turn may support and facilitate rotation of the wheel hub and the wheel about a spindle axis 30 along which the spindle 20 may extend. The spindle 20 may be provided with or mounted to a structural component 32 having a steerable or a non-steerable configuration. In a steerable configuration, the spindle 20 may be mounted to a steerable structural component, such as a steering knuckle. In a non-steerable configuration, the spindle 20 may be mounted to a non-steerable structural component, such as a non-rotatable knuckle or an axle housing of an axle assembly as illustrated in FIG. 1. For instance, the spindle 20 extend from and may be fixedly positioned with respect to an arm portion of an axle housing. In at least one configuration, the axle housing may receive and support an axle shaft that may extend through the spindle 20 and may be rotatable about the spindle axis 30. The spindle 20 may be provided as a separate component that may be fastened to its associated supporting structural component 32. Alternatively, it is contemplated that the spindle 20 may be integrally formed with a supporting structural component in one or more configurations. In at least one configuration, the spindle 20 may include a tubular portion 40 and a flange 42.

Figure 3:
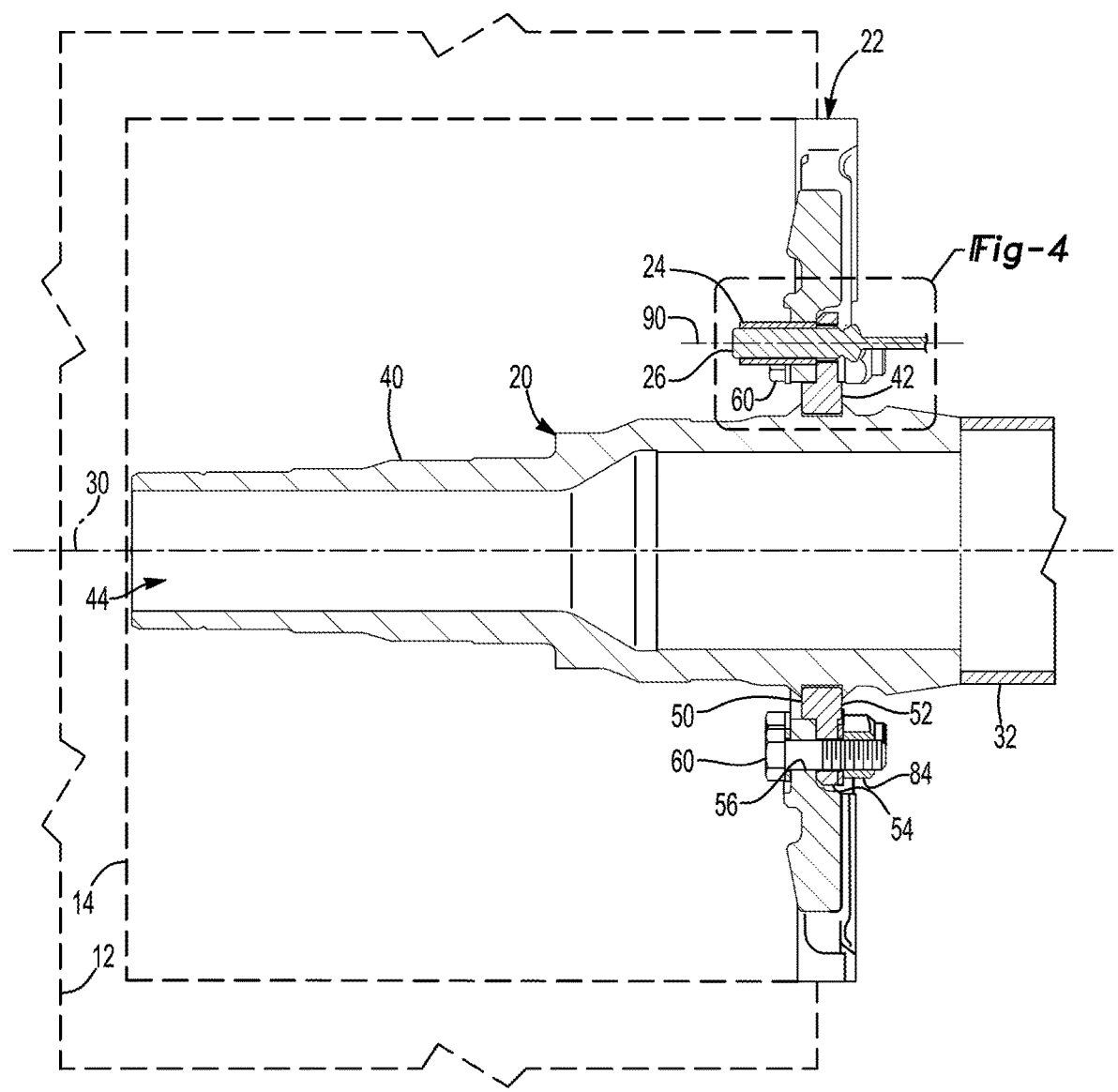
FIG. 3 is a section view along section line 3-3.

Referring primarily to FIGS. 2 and 3, the tubular portion 40 may extend along or may be disposed around the spindle axis 30. The tubular portion 40 may extend from a first end of the spindle 20 to the flange 42 or through the flange 42. The first end of the spindle 20 may be a distal end of the spindle 20 that may face away from the structural component 32. In at least one configuration, the tubular portion 40 may be hollow and may at least partially define a spindle hole 44.

The flange 42 may extend from the tubular portion 40. For example, the flange 42 may be disposed proximate a second end of the spindle 20 that may be disposed opposite the first end. In addition, the flange 42 may extend radially outward from the tubular portion 40 such that the flange 42 extends farther from the spindle axis 30 than the tubular portion 40. The flange 42 may be hollow and may receive the tubular portion 40 of the spindle 20. Alternatively, the flange 42 may be integrally formed with the tubular portion 40. In at least one configuration, the flange 42 may include a first flange side 50, a second flange side 52, an outer flange side 54, one or more fastener holes 56, and a first locator hole 58.

The first flange side 50 may face toward the first end of the spindle 20. The first flange side 50 may extend from the tubular portion 40 toward or to the outer flange side 54.

The second flange side 52 may be disposed opposite the first flange side 50. As such, the second flange side 52 may face toward the structural component 32. In addition, the second flange side 52 or a portion thereof may extend generally parallel to the first flange side 50. The second flange side 52 may extend from the outer flange side 54 toward the spindle axis 30.

The outer flange side 54 may face away from the spindle axis 30. In addition, the outer flange side 54 may extend from the first flange side 50 to the second flange side 52. In at least one configuration, the outer flange side 54 may be an outside circumference of the flange 42 and may be disposed at a substantially constant radial distance from the spindle axis 30.

One or more fastener holes 56 may be provided in the flange 42. The fastener holes 56 may be through holes that may extend from the first flange side 50 to the second flange side 52. The fastener holes 56 may be arranged around the spindle axis 30 such that the fastener holes 56 may be spaced apart from each other. The fastener holes 56 may be disposed farther from the spindle axis 30 than the spindle hole 44 and closer to the spindle axis 30 than the outer flange side 54. In at least one configuration, the fastener holes 56 may be disposed at a substantially constant radial distance from the spindle axis 30. A fastener hole 56 may receive a fastener 60, such as a bolt, that may facilitate coupling of the brake torque plate 22 to the flange 42 of the spindle 20. Moreover, the fastener hole 56 may have a larger diameter than the fastener 60 facilitate insertion of the fastener 60. Accordingly, a clearance fit may be provided between the fastener hole 56 and the fastener 60.

The first locator hole 58 may be provided in the flange 42 and may be defined by the flange 42. The first locator hole 58 may be a through hole that may extend from the first flange side 50 to the second flange side 52. The first locator hole 58 may be spaced apart from the fastener holes 56. In addition, the first locator hole 58 may be positioned in a radial direction between the spindle hole 44 and the outer flange side 54. The first locator hole 58 may be disposed parallel or substantially parallel to one or more fastener holes 56 and may be disposed in a parallel or substantially parallel relationship with the spindle axis 30. The first locator hole 58 may have the same diameter than a fastener hole 56 or may have a different diameter than the fastener holes 56 to help distinguish the first locator hole 58 from the fastener holes 56.

Figure 5:
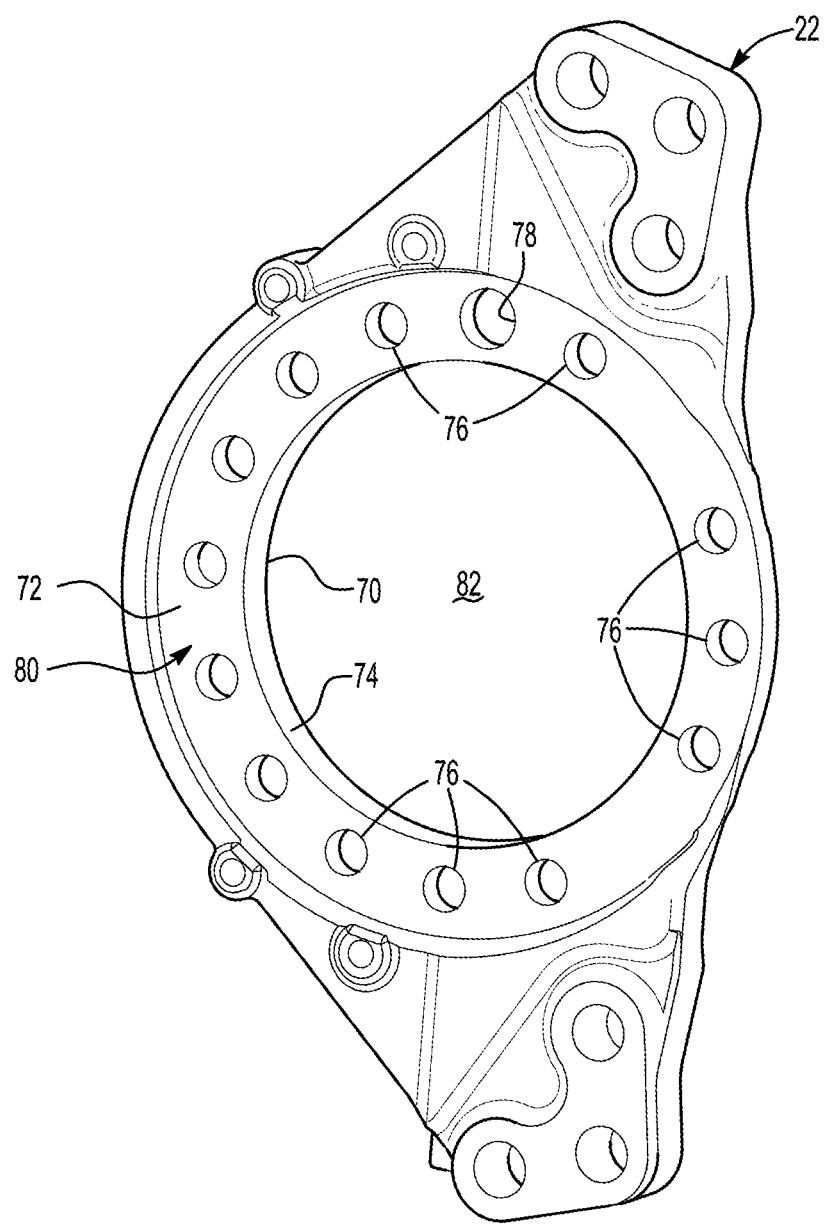
FIG. 5 is a perspective view of a torque plate that may be provided with the wheel end support assembly.
Figure 6:
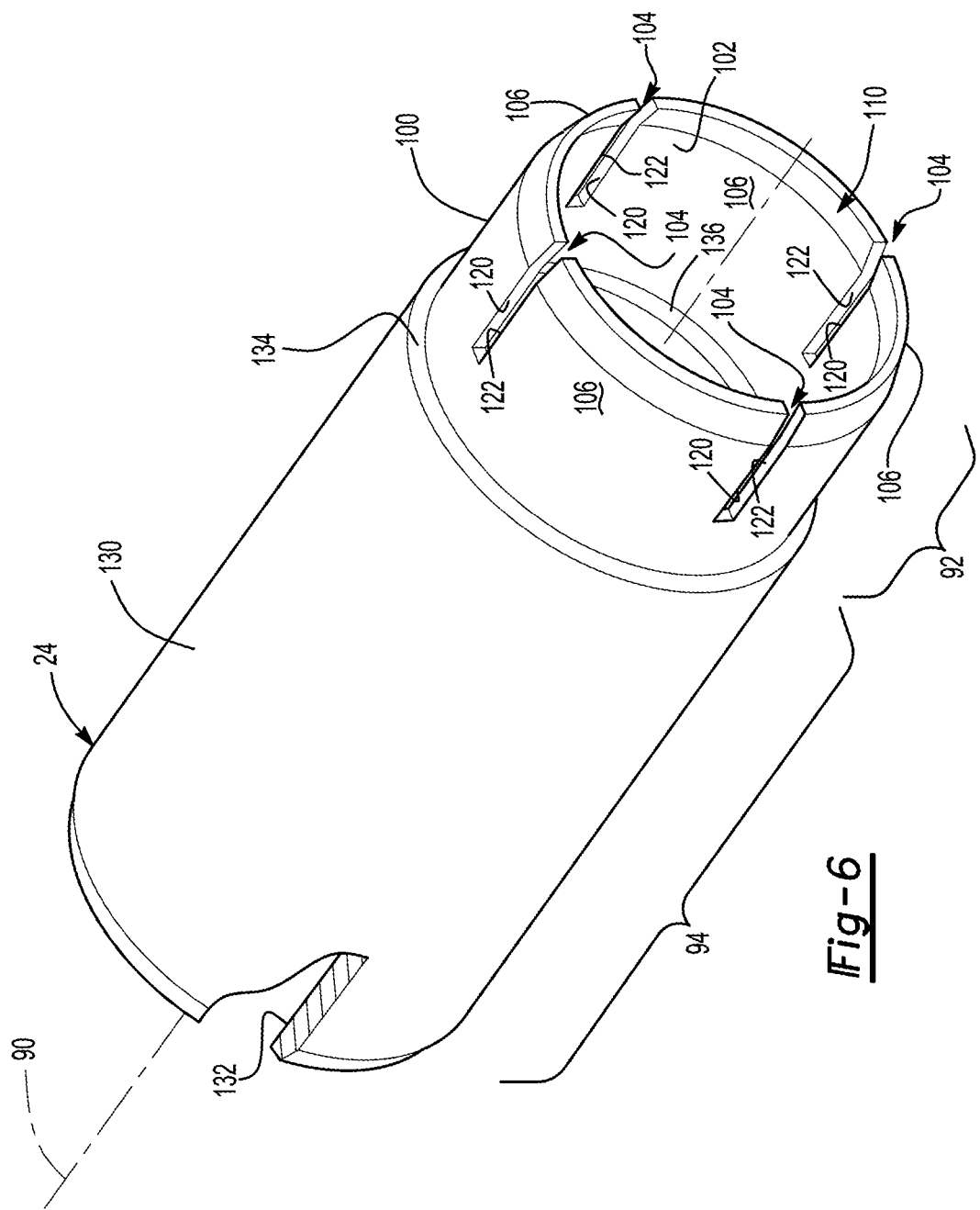
FIG. 6 is a perspective view of a locator bushing that may be provided with the wheel end support assembly.

Referring to FIGS. 2, 3 and 5, the brake torque plate 22, which may also be referred to as a brake spider, may be adapted to support a brake assembly. The brake assembly may have any suitable configuration. For instance, the brake assembly may be configured as a disc brake or a drum brake. The brake torque plate 22 may be fixedly disposed on the flange 42 and may encircle extend continuously around the flange 42 and the spindle axis 30. In at least one configuration and as is best shown in FIG. 5, the brake torque plate 22 may include a first side 70, a second side 72, an inner side 74, one or more fastener holes 76, and a second locator hole 78.

The first side 70 may face away from the structural component 32 and may face toward the first end of the spindle 20.

The second side 72 may be disposed opposite the first side 70. As such, the second side 72 may face toward the structural component 32. A recess 80 may be provided in the second side 72 that may extend in an axial direction toward the first side 70. The recess 80 may receive the flange 42. In addition, the first flange side 50 may engage or contact a portion of the second side 72.

The inner side 74 may face toward the spindle 20 and the spindle axis 30. In addition, the inner side 74 may extend between the first side 70 and the second side 72. The inner side 74 may at least partially define the recess 80. In addition, the inner side 74 may define a through hole 82 that may extend around the spindle axis 30 and through which the spindle 20 may extend.

One or more fastener holes 76 may be configured as through holes and may extend from the first side 70 to the second side 72. The fastener holes 76 may be arranged around the spindle axis 30 such that the fastener holes 76 may be spaced apart from each other. Each fastener hole 76 may be aligned with a corresponding fastener hole 56 of the flange 42. A fastener 60 may extend through corresponding fastener holes 56, 76 to facilitate coupling of the spindle 20 and the brake torque plate 22. In at least one configuration and as is best shown with reference to FIGS. 1 and 4, a nut 84 may threadingly engage the fastener 60 to help secure the brake torque plate 22 to the flange 42 and inhibit removal of the fastener 60. A washer 86 may also be provided between the head of the fastener 60 and the brake torque plate 22, between the nut 84 and the brake torque plate 22, or both.

Figure 4:
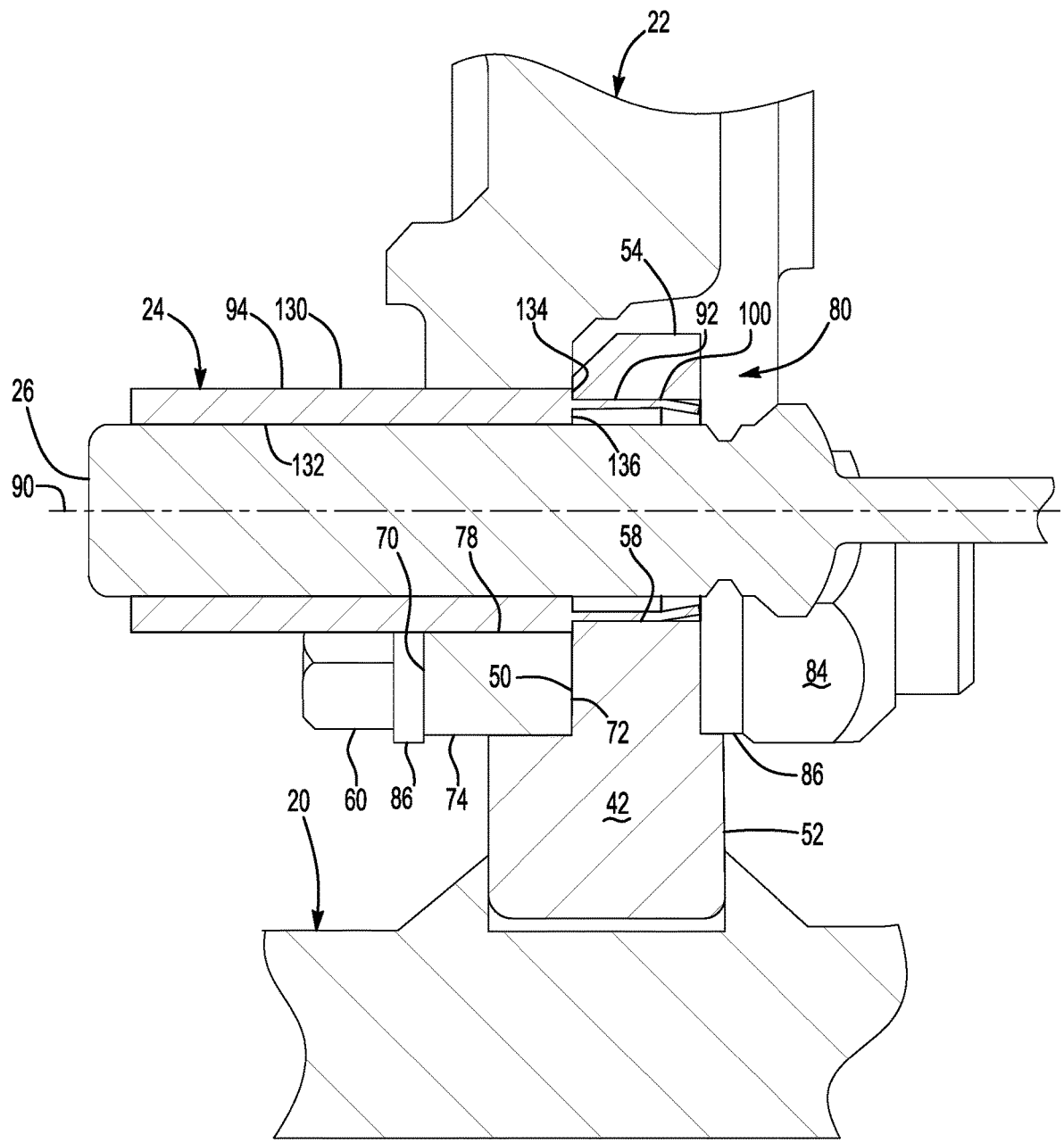
FIG. 4 is a magnified view of a portion of FIG. 3.

Referring to FIGS. 2, 4 and 5, the second locator hole 78 may be a through hole that may extend from the first side 70 to the second side 72. The second locator hole 78 may be spaced apart from the fastener holes 76. In addition, the second locator hole 78 may be disposed parallel or substantially parallel to the first locator hole 58 and may be disposed in a parallel or substantially parallel relationship with the spindle axis 30. The second locator hole 78 may have a diameter that differs from the diameter of the first locator hole 58. For instance, the first locator hole 58 may have a first diameter and the second locator hole 78 may have a second diameter that may differ from the first diameter. In at least one configuration, the first diameter may be less than the second diameter.

Referring to FIGS. 2-4 and 6, the locator bushing 24 may facilitate alignment of the spindle 20 and the brake torque plate 22. For instance, the locator bushing 24 may rotationally align the spindle 20 and the brake torque plate 22 such that the first locator hole 58 and the second locator hole 78 may be substantially coaxially disposed, which in turn may sufficiently align the fastener holes 56 in the flange 42 with the fastener holes 76 in the brake torque plate 22 such that a fastener 60 is insertable into corresponding fastener holes 56, 76. The locator bushing 24 may be received in the first locator hole 58 and the second locator hole 78. The locator bushing 24 may protrude out of the first locator hole 58, the second locator hole 78, or both. In the configuration shown, the locator bushing 24 is shown extending through the first locator hole 58 and the second locator hole 78 such that the locator bushing 24 protrudes from the brake torque plate 22. In at least one configuration, the locator bushing 24 may be at least partially hollow and may extend along or extend around an axis 90, which may also be referred to as a bushing axis. In addition, the locator bushing 24 may include a first portion 92 and a second portion 94, which are best shown with reference to FIGS. 4 and 6.

The first portion 92 may be disposed at the first end of the locator bushing 24. The first portion 92 may be received in the first locator hole 58. In at least one configuration, the first portion 92 may have a first outer surface 100, a first inner surface 102, one or more slots 104, and a plurality of tabs 106.

The first outer surface 100 may face away from the axis 90 and may engage the flange 42. Optionally, a portion of the first outer surface 100 may be received in the second locator hole 78 and may be spaced apart from the brake torque plate 22. In at least one configuration, the first outer surface 100 or a portion thereof may be an outer circumferential surface of the first portion 92 and may be disposed at a substantially constant radial distance from the axis 90.

The first inner surface 102 may be disposed opposite the first outer surface 100. As such, the first inner surface 102 may face toward the axis 90 and may be disposed closer to the axis 90 than the first outer surface 100. The first inner surface 102 may be an inner circumferential surface of the first portion 92 and may be disposed at a substantially constant radial distance from the axis 90. In at least one configuration, the first inner surface 102 may at least partially define a cavity 110 of the locator bushing 24. The first inner surface 102 may be spaced apart from the sensor 26.

One or more slots 104 may be provided in the first portion 92. In the configuration shown, four slots 104 are illustrated; however, it is contemplated that a greater or lesser number of slots 104 may be provided. A slot 104 may extend through the first portion 92 from the first outer surface 100 to the first inner surface 102. In addition, a slot 104 may extend from the first end or distal end of the first portion 92 toward the second portion 94 and the opposite end of the locator bushing 24. In at least one configuration, a slot may extend in an axial direction or substantially parallel to the axis 90. The slots 104 may be at least partially received in the first locator hole 58. The slots 104 may separate the first portion 92 into tabs 106.

A tab 106 may be located between a pair of slots 104. As such, a tab 106 may have a first lateral side 120 that may partially define one slot 104 and a second lateral side 122 that may be disposed opposite the first lateral side 120 that may partially define another slot 104. A tab 106 be configured to flex when the locator bushing 24 is inserted into the first locator hole 58 as will be discussed in more detail below.

The second portion 94 may be disposed at the second end of the locator bushing 24. The second portion 94 may be received in the second locator hole 78. The second portion 94 may not be received in the first locator hole 58. In at least one configuration, the second portion 94 may extend from the first portion 92 and may have a second outer surface 130, a second inner surface 132, an outer step surface 134, and an inner step surface 136.

The second outer surface 130 may face away from the axis 90. The second outer surface 130 may engage the brake torque plate 22. In at least one configuration, the second outer surface 130 or a portion thereof may be an outer circumferential surface of the second portion 94 and may be disposed at a substantially constant radial distance from the axis 90. The second outer surface 130 may have a different diameter than the first outer surface 100. For instance, the second outer surface 130 may be disposed farther from the axis 90 than the first outer surface 100. The second outer surface 130 may be spaced apart from the spindle 20 and may not be received in the first locator hole 58.

The second inner surface 132 may be disposed opposite the second outer surface 130. As such, the second inner surface 132 may face toward the axis 90 and may be disposed closer to the axis 90 than the second outer surface 130. In at least one configuration, the second inner surface 132 may be an inner circumferential surface of the second portion 94 and may be disposed at a substantially constant radial distance from the axis 90. The second inner surface 132 and the first inner surface 102 may have different diameters. For instance, the first inner surface 102 may be disposed farther from the axis 90 than the second inner surface 132. In at least one configuration, the second inner surface 132 may at least partially define the cavity 110 of the locator bushing 24. For instance, the cavity 110 may be a through hole that may be defined by the first inner surface 102, the second inner surface 132, and the inner step surface 136.

The outer step surface 134 may extend from an end of the first outer surface 100 to an end of the second outer surface 130. As such, the outer step surface 134 may extend from the first outer surface 100 and away from the axis 90 to the second outer surface 130. In at least one configuration, the outer step surface 134 may be disposed substantially perpendicular to the axis 90. The slots 104 may extend in an axial direction toward the outer step surface 134 and may be spaced apart from the outer step surface 134 or may extend to the outer step surface 134.

The inner step surface 136 may extend from an end of the first inner surface 102 to an end of the second inner surface 132. As such, the inner step surface 136 may extend from the second inner surface 132 and away from the axis 90 to the first inner surface 102. In at least one configuration, the inner step surface 136 may be disposed directly opposite the outer step surface 134 and may be disposed substantially parallel to the outer step surface 134. The slots 104 may extend toward or to the inner step surface 136. In the configuration shown, the slots 104 are spaced apart from the inner step surface 136.

Referring primarily to FIGS. 2 and 4, the sensor 26 may be received in the locator bushing 24 and may be mounted to the locator bushing 24. For instance, the sensor 26 may be received in the cavity 110 of the locator bushing 24 and may extend through the first locator hole 58 and into or through the second locator hole 78. The sensor 26 may be of any suitable type. For instance, the sensor 26 may be an antilock brake sensor or a wheel speed sensor that may detect rotation of the wheel hub. As an example, the sensor 26 may detect an encoder wheel such as a tone ring. The tone ring may be configured as a ring that may be mounted on the hub and may have teeth that may be arranged around the spindle axis 30 and a repeating arrangement as known by those skilled in the art. Sensor 26 may engage or may be coupled to the first portion 92, the second portion 94, or both. In the configuration shown, the sensor 26 is illustrated as being spaced apart from the first inner surface 102 and may engage or contact the second inner surface 132.

The wheel end support assembly 10 may be assembled in various ways, an example of which is described below.

First, the spindle 20 and the brake torque plate 22 may be positioned adjacent to each other. For example, the spindle 20 may be inserted through the through hole 82 in the brake torque plate 22 such that the brake torque plate 22 may be positioned adjacent to the flange 42 of the spindle 20 so the flange 42 may be received in the recess 80 of the brake torque plate 22. The spindle 20 and the brake torque plate 22 may be rotationally positioned about the spindle axis 30 such that the first locator hole 58 and the second locator hole 78 may be approximately aligned with each other.

Next, the locator bushing 24 may be inserted into the first locator hole 58 and the second locator hole 78 to more precisely align the spindle 20 and the brake torque plate 22. For example, the locator bushing 24 may be oriented such that the first portion 92 faces toward and is insertable into the second locator hole 78 before being inserted into the first locator hole 58. The locator bushing 24 may then be advanced in an axial direction such that the first portion 92 moves through the second locator hole 78 and into the first locator hole 58. Sufficient advancement of the locator bushing 24 in an axial direction may also moves the second portion 94 into the second locator hole 78. The first portion 92 and the second portion 94 may cooperate with the surfaces that define the first locator hole 58 and the second locator hole 78, respectively, to align the first locator hole 58 and the second locator hole 78. More specifically, the first locator hole 58 may be coaxially disposed with the second locator hole 78 when the first locator hole 58 in the second locator hole 78 are aligned. For example, the first outer surface 100 of the first portion 92 may be received in the first locator hole 58 and may engage or contact the spindle 20 while the second outer surface 130 may be received in the second locator hole 78 and may engage or contact the brake torque plate 22.

Next, the brake torque plate 22 may be coupled to the flange 42. Fasteners 60 may be inserted through the fastener holes 56 in the flange 42 and fastener holes 76 in the brake torque plate 22 and may be tightened or otherwise secured to couple the brake torque plate 22 to the flange 42 and inhibit or prevent relative movement between the brake torque plate 22 and the flange 42.

The sensor 26 may be inserted into the cavity 110 in the locator bushing 24 either before or after the locator bushing 24 is inserted into the first locator hole 58 and the second locator hole 78.

The wheel end support assembly as described above may allow the locator bushing to align a brake torque plate and a spindle using a single component while allowing the fastener holes in the brake torque plate and the spindle to be provided with larger tolerances, which may reduce manufacturing cost and improve ease of assembly as compared to providing multiple fastener holes in the brake torque plate and the spindle with tighter tolerances. The flexible or compliant tabs at the end of the locator bushing that are inserted into the axle flange may facilitate alignment or self-centering of the locator holes along a common axis, which may improve rotational positioning accuracy of the brake torque plate with respect to the spindle without appreciably increasing assembly time or manufacturing costs. Moreover, the fastener holes may be provided with larger diameters to provide ample free play between a fastener and a fastener hole to make alignment and insertion of the fasteners easier.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A wheel end support assembly comprising:
    a spindle that is adapted to support a wheel, the spindle having a flange that defines a first locator hole;
    a brake torque plate that is adapted to support a brake assembly, wherein the brake torque plate is disposed on the flange and defines a second locator hole;
    a locator bushing that is received in the first locator hole and the second locator hole and that aligns the brake torque plate to the spindle; and
    a sensor that is received in the locator bushing.

2. The assembly of claim 1 wherein the locator bushing extends through the first locator hole and the second locator hole such that the locator bushing protrudes from the brake torque plate.

3. The assembly of claim 1 wherein the first locator hole has a first diameter and the second locator hole has a second diameter that differs from the first diameter.

4. The assembly of claim 3 wherein the first diameter is less than the second diameter.

5. The assembly of claim 1 wherein the brake torque plate defines a through hole through which the spindle extends and a recess that extends from the through hole and receives the flange.

6. A wheel end support assembly comprising:
    a spindle that is adapted to support a wheel, the spindle having a flange that defines a first locator hole;
    a brake torque plate for supporting a brake assembly, wherein the brake torque plate is fastened to the flange and defines a second locator hole;
    a locator bushing that extends around an axis and rotationally aligns the brake torque plate to the spindle, the locator bushing including:
        a first portion that is disposed at a first end of the locator bushing and is received in the first locator hole, the first portion having a first outer surface that faces away from the axis and engages the flange; and
        a second portion that is disposed at a second end of the locator bushing and is received in the second locator hole, the second portion having a second outer surface that faces away from the axis and engages the brake torque plate, wherein the first outer surface and the second outer surface have different diameters; and
    a sensor that is received in the locator bushing and extends through the first locator hole and the second locator hole.

7. The assembly of claim 6 wherein the second outer surface is disposed farther from the axis than the first outer surface.

8. The assembly of claim 6 wherein the first outer surface is received in the first locator hole and is spaced apart from the brake torque plate.

9. The assembly of claim 6 wherein the second outer surface is spaced apart from a tubular portion of the spindle and is not received in the first locator hole.

10. The assembly of claim 6 wherein the first portion has a first inner surface that is disposed opposite the first outer surface, the second portion has a second inner surface that is disposed opposite the second outer surface, and the first inner surface and the second inner surface have different diameters.

11. The assembly of claim 10 wherein the first inner surface is disposed farther from the axis than the second inner surface.

12. The assembly of claim 10 wherein the sensor is spaced apart from the first inner surface and engages the second inner surface.

13. The assembly of claim 10 wherein the first portion has a plurality of slots that extend from the first outer surface to the first inner surface.

14. The assembly of claim 13 wherein the slots are at least partially received in the first locator hole and separate the first portion into a plurality of tabs that are configured to flex when the locator bushing is inserted into the first locator hole.

15. The assembly of claim 13 wherein the slots extend in an axial direction from the first end toward the second end.

16. The assembly of claim 13 wherein an outer step surface extends from an end of the first outer surface to an end of the second outer surface, an inner step surface extends from an end of the first inner surface to an end of the second inner surface, and the slots are spaced apart from the outer step surface and the inner step surface.

17. A method of assembling a wheel end support assembly comprising:
 positioning a brake torque plate adjacent to a flange of a spindle, wherein the flange defines a first locator hole and a first fastener hole and the brake torque plate defines a second locator hole and a second fastener hole;
 inserting a locator bushing into the first locator hole and the second locator hole to align the brake torque plate and the spindle; and
 coupling the brake torque plate to the flange with a fastener that is inserted into the first fastener hole and the second fastener hole.

18. The method of claim 17 wherein the locator bushing is inserted into the second locator hole before being inserted into the first locator hole.

19. The method of claim 17 wherein the locator bushing includes:
 a first portion disposed at a first end of the locator bushing having a first outer surface that is received in the first locator hole and that engages the spindle and a plurality of slots that extend from the first end and separate the first portion into a plurality of tabs that are configured to flex when inserted into the first locator hole; and
 a second portion that extends from the first portion to a second end of the locator bushing, the second portion having a second outer surface that has a different diameter than the first outer surface, wherein the second outer surface is received in the second locator hole and engages the brake torque plate.

20. The method of claim 17 further comprising inserting a sensor into a hole in the locator bushing after coupling the brake torque plate to the flange.

\* \* \* \* \*